July 8, 1930. A. L. DUNCAN Re. 17,726

PEACH PITTING APPARATUS
Original Filed Feb. 4, 1924 9 Sheets-Sheet 1

Inventor
Arthur L. Duncan
William A. Strauch
Attorney

July 8, 1930. A. L. DUNCAN Re. 17,726

PEACH PITTING APPARATUS
Original Filed Feb. 4, 1924 9 Sheets-Sheet 2

Inventor
Arthur L. Duncan
William A. Strauch
Attorney

PEACH PITTING APPARATUS
Original Filed Feb. 4, 1924 9 Sheets-Sheet 3

Inventor
Arthur L. Duncan
By William A. Strauch
Attorney

July 8, 1930. A. L. DUNCAN Re. 17,726

PEACH PITTING APPARATUS
Original Filed Feb. 4, 1924 9 Sheets-Sheet 4

Inventor
Arthur L. Duncan
By William A. Strauch
Attorney

July 8, 1930. A. L. DUNCAN Re. 17,726
PEACH PITTING APPARATUS
Original Filed Feb. 4, 1924 9 Sheets-Sheet 5
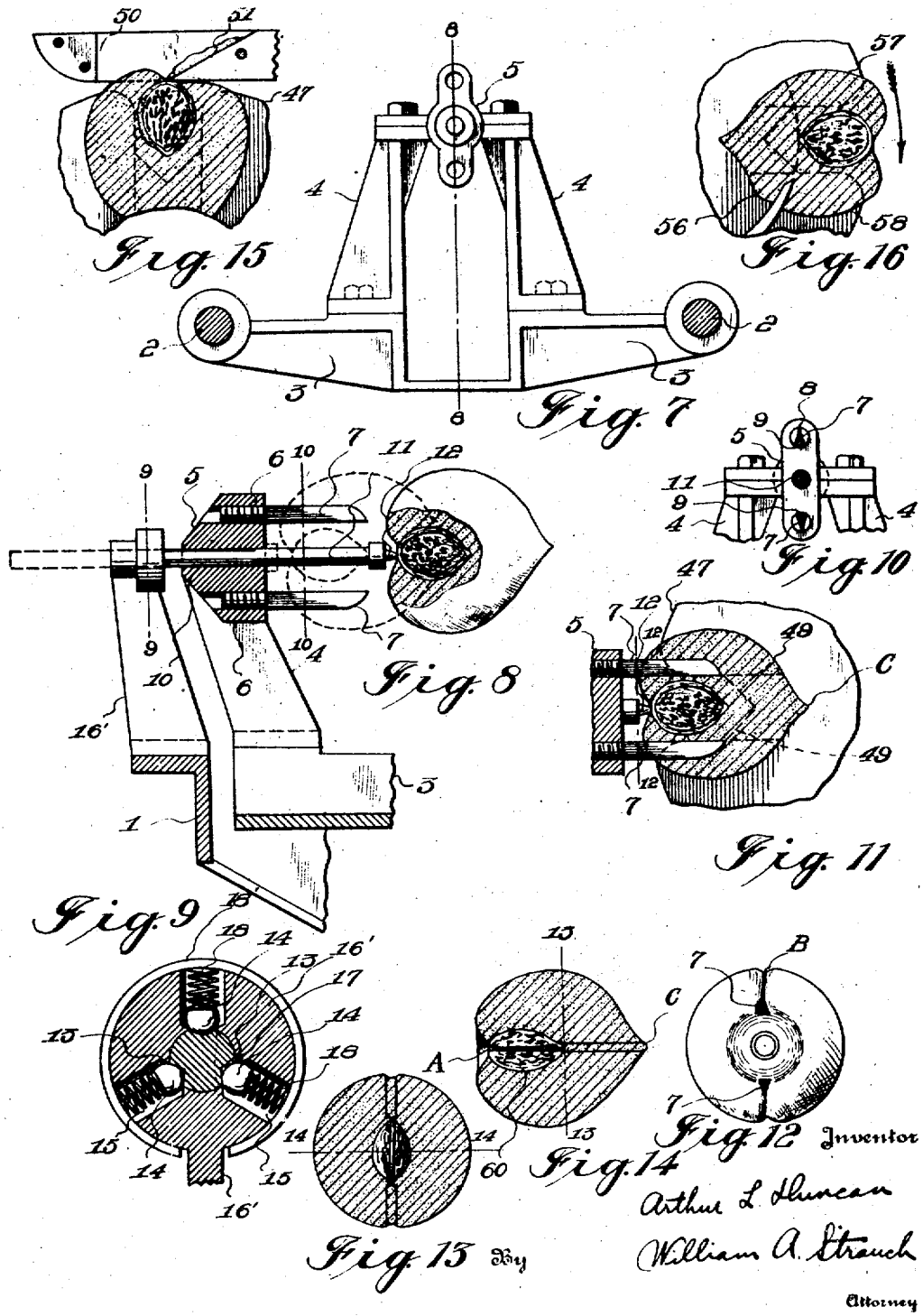
Inventor
Arthur L. Duncan
By William A. Strauch
Attorney July 8, 1930. A. L. DUNCAN Re. 17,726
PEACH PITTING APPARATUS
Original Filed Feb. 4, 1924 9 Sheets-Sheet 6
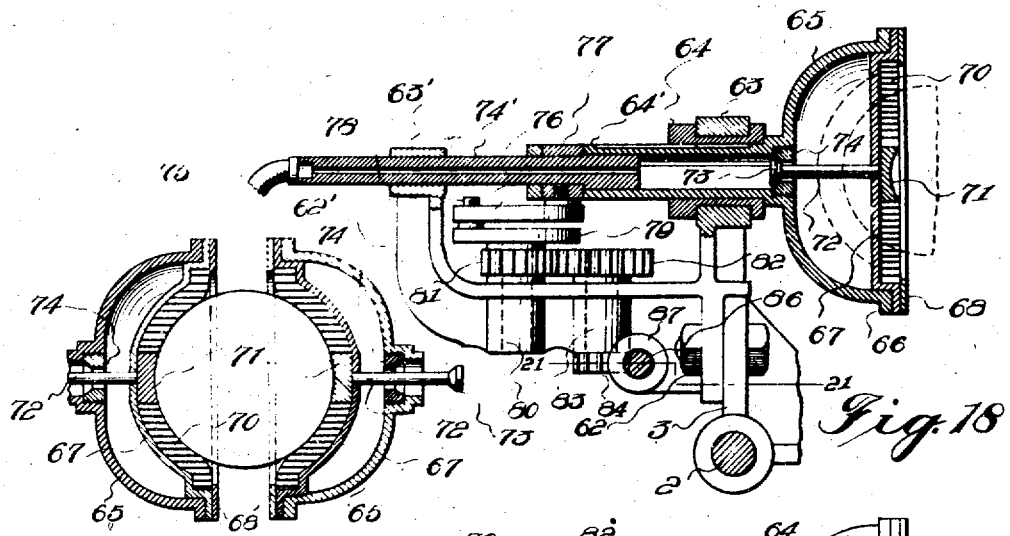
Fig. 18
Fig. 19
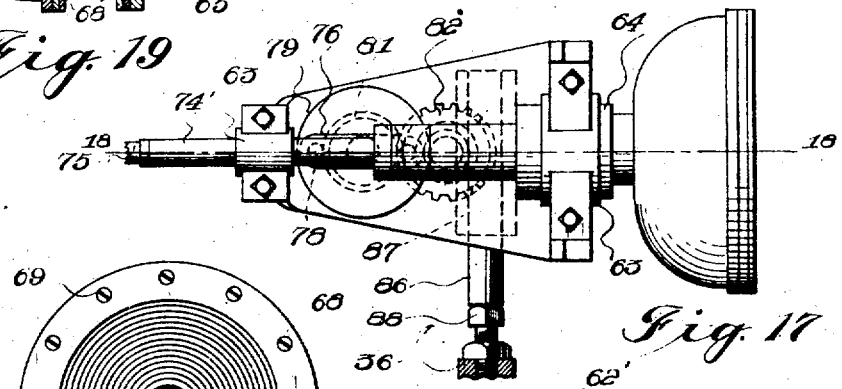
Fig. 17
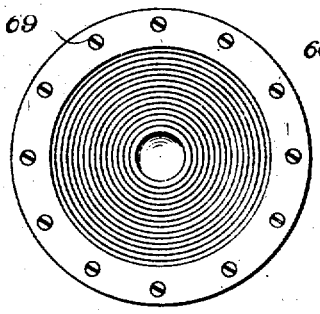
Fig. 20
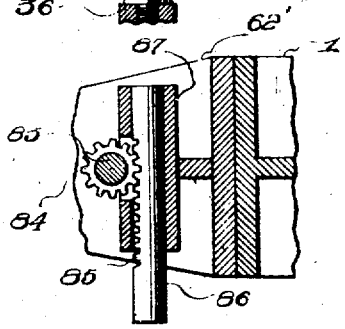
Fig. 21
Inventor
Arthur L. Duncan
William A. Strauch
By
Attorney PEACH PITTING APPARATUS
Original Filed Feb. 4, 1924 9 Sheets-Sheet 7

Inventor
Arthur L. Duncan
William A. Strauch
Attorney

July 8, 1930. A. L. DUNCAN Re. 17,726
PEACH PITTING APPARATUS
Original Filed Feb. 4, 1924 9 Sheets-Sheet 8
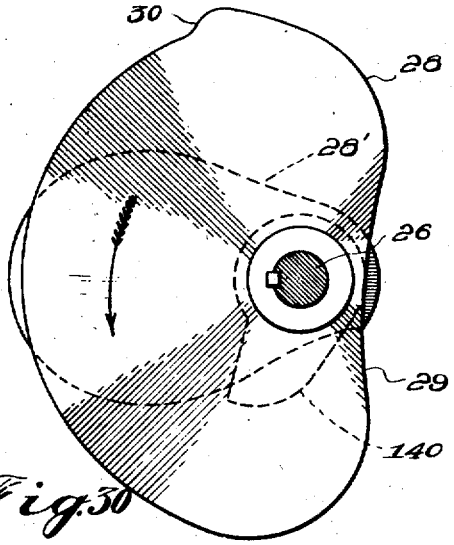
Fig. 30
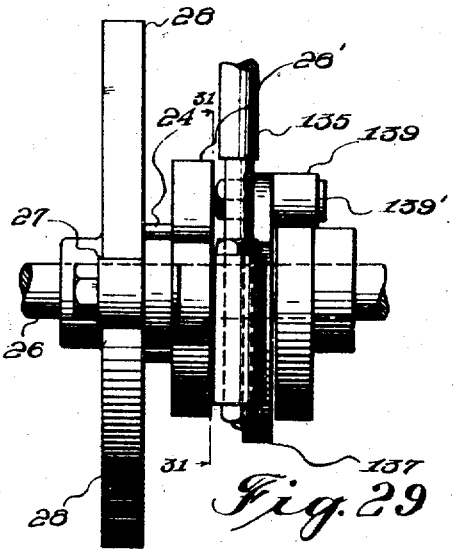
Fig. 29
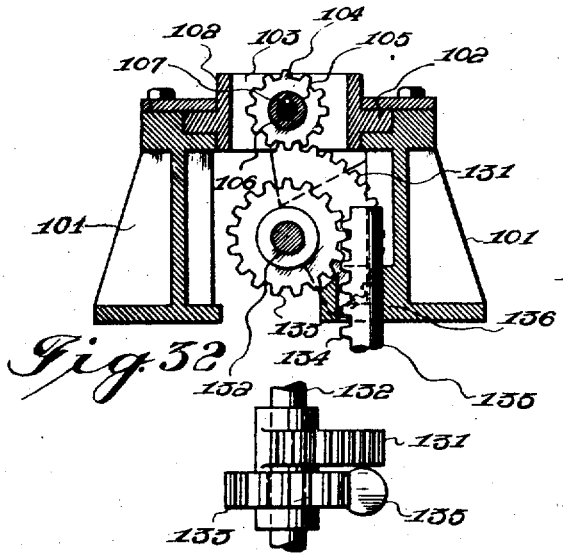
Fig. 32
Fig. 33
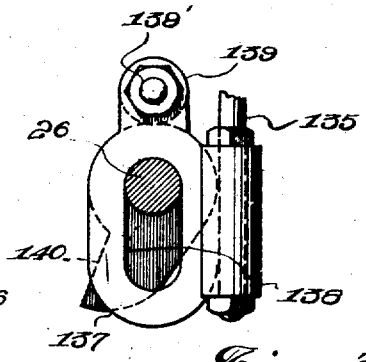
Fig. 31
Inventor
Arthur L. Duncan
By William A. Strauch
Attorney July 8, 1930. A. L. DUNCAN Re. 17,726

PEACH PITTING APPARATUS
Original Filed Feb. 4, 1924 9 Sheets-Sheet 9

Inventor
Arthur L. Duncan

By William A. Strauch

Attorney

Reissued July 8, 1930 Re. 17,726

UNITED STATES PATENT OFFICE

ARTHUR L. DUNCAN, OF OAKLAND, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

PEACH-PITTING APPARATUS

Original No. 1,498,078, dated June 17, 1924, Serial No. 690,416, filed February 4, 1924. Reissue No. 16,259, dated February 9, 1926, Serial No. 74,402, filed December 9, 1925. This application for reissue filed October 6, 1928. Serial No. 310,884.

The present application relates to coring and pitting fruit and the like articles, and more particularly the invention relates to improvements for pitting or coring and trimming fruit such as clingstone peaches, freestone peaches, plums, pears, apples and the like.

In natural formation of single pit fruits such as peaches the pit consists of two curved side surfaces, and a rib or fin like edge form around the suture of the sides substantially in the plane of greatest sectional area of the pit. At the point of attachment of the stem to the fruit, the pit comes practically to the surface of the flesh or pulp where there is a natural depression, and substantially in the plane of the fin like edge or rib of the pit a natural crease is formed on the outside of the fruit. Opposite the stem end of the fruit a spike is formed on the pit and on the pulp, while on some varieties a fibrous growth extends from the spike of the pit to the spike formation on the pulp.

It has been heretofore the practice in pitting clingstone peaches by hand to make a cut with a straight bladed knife around the fruit to the depth of the pit, following the line of the outside crease, then to insert a curved pitting spoon from the stem end of the fruit along one of the curved sides of the pit as a guide, the curved pitting spoon being inserted about midway between the lines of the fin like edge, rib or suture, then cutting through the pulp from the point of insertion to one side of the cut which is first made with the straight bladed knife, then receding to the opposite side of the cut made by the straight bladed knife. This separates one half of the peach. The other half, with the pit imbedded is then separated from the pit by gouging out the pit with the same curved pitting spoon. The pulp or flesh is now separated substantially in halves, with the pit cut free in the manner above set forth. This prior hand process is relatively wasteful due to mutilation of a large percentage of the fruit by inexperienced and careless help and is also slow and expensive.

I have discovered that when pitting fruit such as clingstone peaches improved results are obtained, and the pit may be economically removed if the natural crease and the fin like edge or rib formation or suture of the pit are utilized as a guide for insertion of the pitting spoon or knife. With the concept of utilizing as a basis, the fin like or ribbed edge of the pit and the natural crease on the outside of the fruit as guides, I have discovered various improved apparatus and methods of pitting or coring fruit such as clingstone peaches.

My improved methods for hand pitting comprise the steps of utilizing the natural crease formation to indicate the location of the fin like or ribbed edge of the pit, inserting a curved pitting knife or spoon in the pulp along the fin like or ribbed edge of the pit as a guide for starting the cutting operation, and cutting the pit free from the pulp starting from the fin like or ribbed edge of the pit instead of from the curved side of the pit as has been heretofore the practice. The pulp of the fruit is preferably halved to permit removal of the freed central core or pit. For the canning of high grade fruit, it is preferable that the crease formation of the pulp together with the fibrous material extending from the spike end of the pulp to the spike end of the pit be removed. For this reason it is desirable to remove a slice from the flesh of the fruit including the natural crease formation and fibers. The removal of the slice is however not essential to the practice of the operation, as the pulp may be cut in halves to permit removal of the pit or core, or may be divided in any suitable manner. While first cutting the pit free from the pulp and then separating the pulp in halves to free pit or core therefrom is contemplated within the scope of the invention, it is preferable to divide or separate the pulp substantially in the plane of the rib or fin like edge of the pit prior to cutting the pit or core from the pulp. In the preferred embodiments of the invention a channel or groove is formed in the pulp either by removing a slice therefrom or by forming a wedge shaped cut or incision, or by separating the pulp in any other manner to permit the entry of the cutting knife or pitting spoon in the channel or incision.

Accordingly an object of the present invention is to provide improved methods and apparatus for coring and pitting fruit.

Another object of the invention is to provide an improved apparatus for automatically and mechanically separating a fruit in halves or sections and for removing a pit or core therefrom.

Further objects of the invention are to provide an apparatus capable of uniformly cutting the fruit into sections so that the cut edges will present smooth, even and trimmed surfaces; preferably to remove the fibrous growth extending from the spike end of the pit through the pulp of the fruit and to cut the pit therefrom and present a smooth even pulp body in the cavity occupied by the removed pit; to provide a mechanically operated apparatus capable of operating on a greater number of fruits within a given time than is possible within the same time to be accomplished by present hand methods, and thereby increasing production, enhancing the quality, and reducing the cost of halving, pitting and trimming the fruit.

The specific embodiment of apparatus for carrying out my improved methods hereinafter disclosed consists in a centering or impaling device to receive the fruit to properly present it to trimming, cutting and transfer members; secondly to provide a trimming, cutting and transfer member which in cooperation with other means conveys the fruit into operative relation with trimming and cutting members so that an annular slice to the depth of the pit is removed from the fruit; third, to provide engaging cup members for removing the fruit from the conveying member and so constructed as to conform to the configuration of the fruit without in any manner pinching or injuring the surface thereof; fourth, to provide a mechanism for removing the pulp adhering to the pit at the base of the annular groove and lastly, to provide a pit removing knife designed for reception within the annular groove and to come substantially in contact with the rib or fin like edge or suture of the pit and for movement axially of the pit to cut the same from the fruit body.

With the above-mentioned and other objects in view, the invention consists in the novel methods, construction and combination of parts herein described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawing disclosing one embodiment thereof, wherein:

Figure 3 is a view in end elevation of the structure illustrated in Fig. 1 snowing particularly the operating mechanism for the pit removing knife.

Figure 7 is a view in front elevation of the impaling device.

Figure 8 is a vertical sectional view taken on the line 8—8 of Fig. 7.

Figure 9 is a sectional view taken on the line 9—9 of Figure 8 illustrating the friction devices for the centering plunger.

Figure 10 is a sectional view on line 10—10 of Figure 8 illustrating the particular formation of the impaling knives.

Figure 11 is a vertical sectional view through a peach mounted and centered on the impaling knives.

Figure 12 is a sectional view on line 12—12 of Figure 11.

Figure 13 is a vertical sectional view through a fruit illustrating the cuts formed by the transfer member.

Figure 14 is a sectional view on line 14—14 of Figure 13.

Figure 15 is a sectional view of the fruit as conveyed by the transfer member, illustrating one of the cutter knives cutting a portion of the annular groove at the stem end of the fruit and removing a portion of the material therefrom.

Figure 16 is a view of the same fruit cut as indicated in Fig. 15 and illustrating another of the cutting knives about to remove that portion of the slice from the opposite end of the fruit and which slice was cut by the cutting walls of the transfer member.

Figure 17 is a view in detailed plan of one of the conveying cups.

Figure 18 is a longitudinal sectional view on line 18—18 of Figure 17 illustrating the details of construction of one of the conveying cups.

Figure 19 is a vertical sectional view through the pair of conveying cups illustrating the same in the act of holding a fruit.

Figure 20 is a view in front elevation of one of the conveying cups.

Figure 21 is a sectional view on line 21—21 of Figure 18.

Figure 29 is a view in detailed elevation of the operating mechanism mounted on the drive shaft.

Figure 30 is a view in side elevation of the cam elements illustrated in Figure 29.

Figure 31 is a vertical sectional view on line 31—31, Figure 29, viewed in the direction of the arrow.

Figure 32 is a view in detail of the mechanism for imparting oscillatory movement to the pit removing knives.

Figure 33 is a view in top plan of the main shaft illustrated in Figure 32 showing the segmental gear carried thereby.

Figure 37:
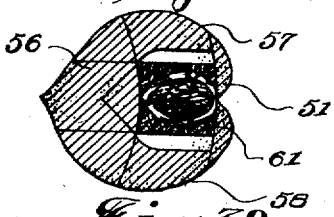

Figure 37 is a similar view of the fruit in another stage of its operation, illustrating the recesses made by the withdrawing of the impaling knives, and the portion of the slice cut from the blossom end of the fruit relieving the side portions of the slice upon each outer edge of the impaling devices, the darkened area surrounding the pit being the only portion of the slice adhering to the pit and pulp.

Figure 38:
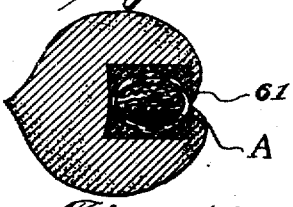

Figure 38 is a similar view of the fruit illustrating all portions of the slice being removed, the darkened portion being that portion adhering to the pit.

Figure 39:
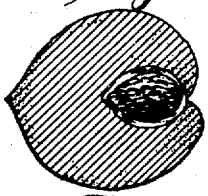

Figure 39 is a similar view of the fruit with the adhering portion cleared from the pit.

Figure 40:
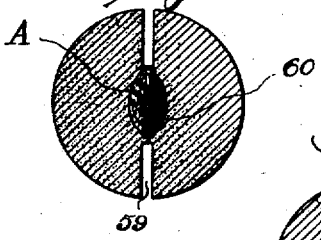

Figure 40 is a view in end elevation of the fruit illustrating the annular groove formed by the removal of the slice.

Figure 41:
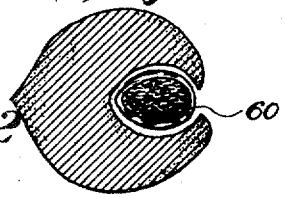
Figure 42:
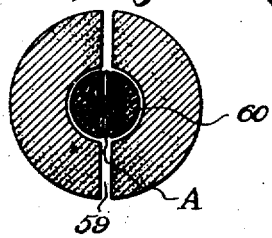

Figure 41 is a similar view of the fruit illustrating the path formed by the cutting knives in their movement circumferentially of the pit and Figure 42 illustrates the two half slices of the fruit separated from the pit.

As shown in the drawings a suitable supporting framework 1 (Figures 1, 2 and 3) is provided in which the parallel guide rods 2 are supported. A carriage 3 is slidably mounted on guide rods 2 and is adapted to reciprocate thereon as will more fully hereinafter appear. Secured to the forward end of the carriage 3 is a supporting bracket member 4 (Figures 1, 2, 7 and 8) upon which a head 5 is mounted. Detachably secured in the head 5 preferably by means of the threaded sections 6 (Figures 8 and 11) are the impaling knives 7 which are preferably disposed parallel to each other in substantially the same vertical plane (Fig. 10) with their sharp edges 8 outward and relatively broad backs 9 thereof toward each other. Slidably supported in the center of the head 5 substantially midway between the knives 7, is a centering member 11. A centering point 12 shaped to fit within the stem depression of the fruit to be pitted is formed on or secured to one end of the member 11. The opposite end of the centering member 11 is provided with grooves 13 (Figure 9) in which the balls 14 are adapted to seat. Balls 14 are retained within recesses 15 formed in the enlarged upper end 16 of member 16′ which is rigidly secured to and supported from the frame 1 (Figure 8). The enlarged end 16 is provided with a central bore 17 in which the grooved end of the member 11 slidably fits. Balls 14 are forced partially through openings in the bottom of the recesses 15 into the grooves 13 of the member 11, by means of the springs 18 which are held in position by the retaining rings 18′. Balls 14 are pressed into the bore 17 by springs 18 with sufficient pressure and the bit of member 11 in the head 5 is sufficiently free so that as the carriage 3 moves to the left in Figure 1, the end of member 11 will enter bore 17 until the balls 14 are engaged, and the member 11 forced to the position shown in Figure 8. When, however, the fruit is to be impaled on the knives 7, the end pressure exerted on the member 11 by the operator in impaling the fruit is sufficient to force the member 11 through the bore 17 past balls 14 until the parts assume the position shown by the dotted line in Figure 8.

Figure 1:
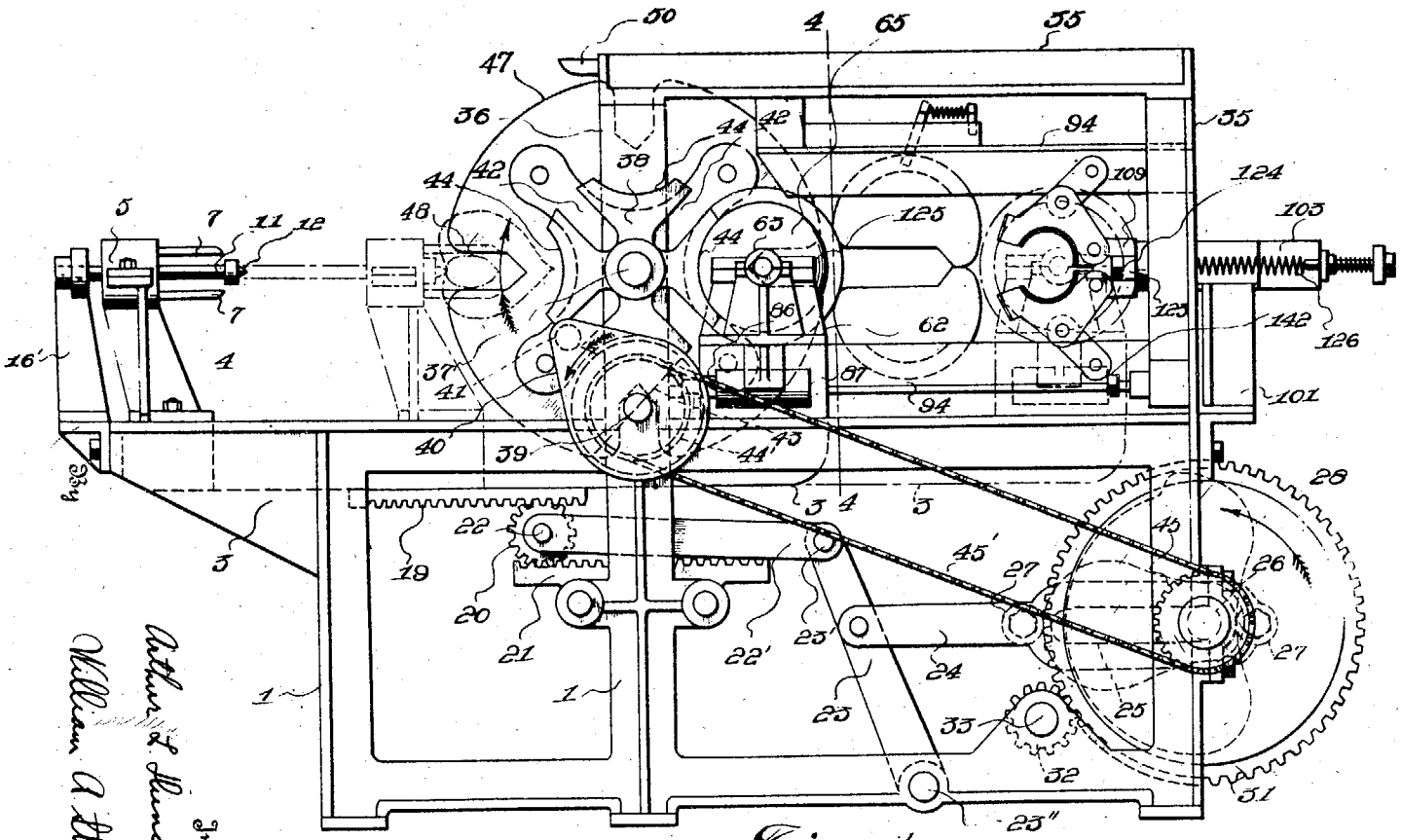
Figure 1 is a view in side elevation.
Figure 2:
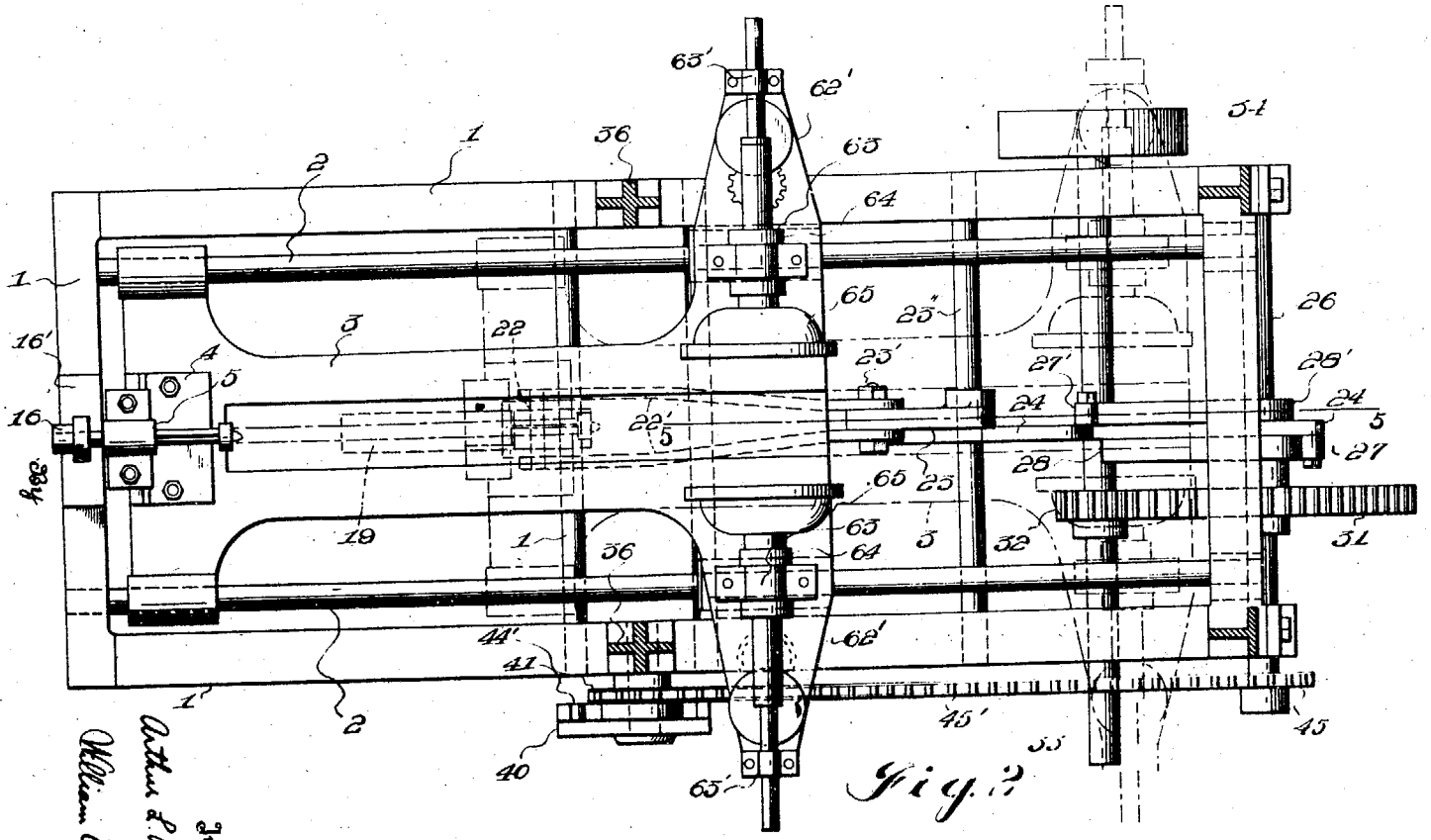
Figure 2 is a view in top plan with certain of the elements removed to clearly disclose the movable bed.

Rigidly secured to the bottom of the carriage 3 is a rack 19 (Fig. 1) which meshes with and is driven by a pinion 20. Pinion 20 is supported upon and meshes with a rack 21 secured to the framework 1, and is journaled in a spindle 22 in the end of actuating links 22′ (Figures 1 and 2). Links 22′ are pivotally secured at their other ends to the upper end of arm 23 by means of a pin 23′ and at its lower end is pivotally supported from frame 1 by the member 23″. Pivotally connected to the arm 23, at a point intermediate its ends, is a member 24 in which is formed a guide and supporting slot 25. A cam shaft 26 suitably supported from frame 1 extends through slot 25 and slidably supports member 24. Rotatably supported from and carried on opposite sides of member 24 (Figures 1 and 2) are the actuating rollers 27 and 27′. The roller 27′ is engaged by an actuating cam 28 (Figures 1, 29 and 30) which is keyed to and driven by the shaft 26 in a manner to impart a motion to the right in Figure 1. As cam shaft 26 is rotated a reciprocating motion will be imparted to member 24 causing actuation of pinion 20 to impart a reciprocating motion to rack 19 and carriage 3. Cam 28 is provided with a relatively flat portion 29 (Figure 30) so arranged that a slight pause is caused in the reciprocating movement of the parts when the carriage 3 is at the left end of its travel as shown in Figure 1, and an abrupt portion 30 is provided to give the carriage 3 a sudden movement as it approaches the end of its travel to the right in Figure 1. Shaft 26 is driven by a gear 31 rigidly secured thereto (Figures 1, 2 and 3) which meshes with and is driven by a pinion 32. Pinion 32 is mounted on and driven by a drive shaft 33 suitably journaled in the frame 1, and driven by a pulley 34 or in any other suitable manner.

Supported on and secured to the frame 1 is a frame structure 35 provided with the vertical legs 36 in which shaft 37 (Figs. 1 and 5) is journaled. Secured on the outer end of the shaft 37 is a radially slotted member 38 of the Geneva gear (Fig. 1). Supported below the member 38 in the vertical leg 36 is a stub shaft 39 (Figures 1 and 2) to the outer end of which a crank 40 is secured. Secured to and extending from one side of crank 40 is a crank pin 41 which is adapted to enter the radial slots 42 of the member 38. Accordingly as crank 40 is rotated in the direction of the arrow in Figure 1, pin 41 will enter the slot 42 at the right thereof and will cause rotation of member 38 an angular distance of 90 degrees of each revolution of crank 40, and as the pin 41 leaves the slot 42, member 38 will come to rest and the locking section 43 will mesh with the adjacent arc shaped locking section 44 holding member 38 locked against rotation until pin 41 again enters the slot 42 to the right thereof in Figure 1, when the sector 43 will be disengaged from the adjacent arc shaped section 44 and will permit rotation of member 38 another quarter of a revolution. Shaft 39 is driven by a sprocket 44′ which in turn is driven from shaft 26 by means of the sprocket 45 secured thereto (Figures 1, 2 and 3) through chain 45′.

Figure 5:
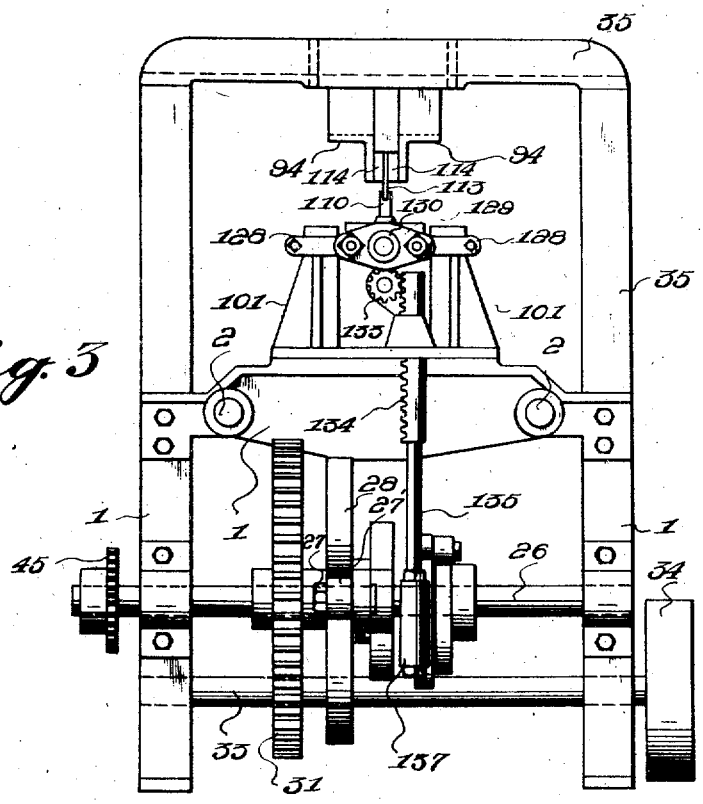
Figure 5 is an enlarged detail sectional view taken on the line 5—5 of Fig. 2.
Figure 4:
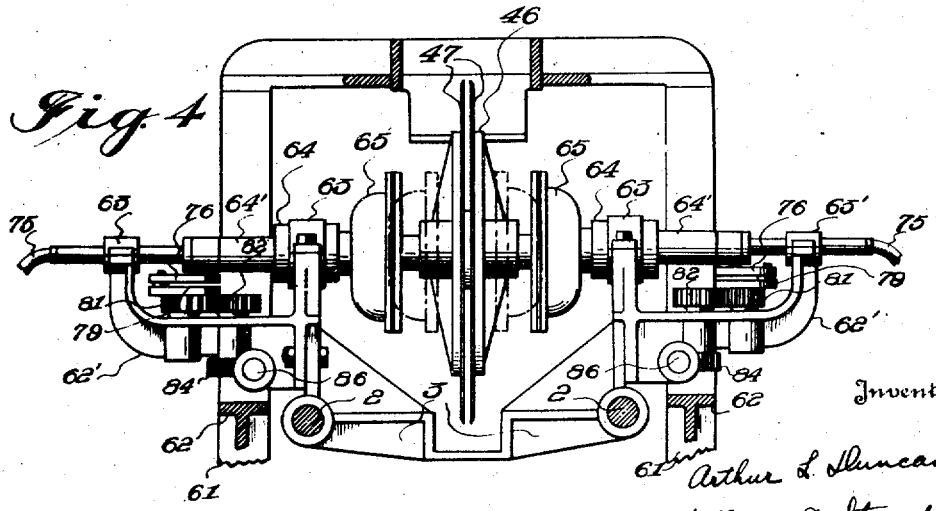
Figure 4 is a transverse sectional view taken on line 4—4 of Figure 1.

Supported on the shaft 37 is a transfer and slicing device 46 made up of cutting plates 47 which are spaced apart sufficiently and so positioned as to permit the entry of the knives 7 between their inner surfaces when carriage 3 is moved to the right in Figure 1. Formed at angular distances of 90 degrees around plates 47 are the radial fruit receiving slots 48, provided with the converging bottom edges 49 (Figs. 1 and 5). The parallel sidewalls of the slot 48 are spaced apart a sufficient distance to permit the entry of the pit of a fruit such as a peach with the plane of the fin edge or natural rib or suture of the pit formation substantially midway between plates 47 and parallel thereto when carriage 3 is moved forward to transfer the fruit from the impaling knives 7 to the transfer member 46 in a manner which will more fully hereinafter appear. A pair of knives 50 (Figs. 1 and 5) one disposed above each plate 47 and substantially parallel thereto are provided. Positioned between knives 50 is a slice removing knife 51. Knives 50 and 51 are positioned in such relation that a slice 51′ (Figs. 15 and 36) will be removed from the end of fruit carried in member 46 as it rotates past the same in the manner shown in Figure 15. Located opposite the point of fixing the fruit on the transfer member 46 is a knife 52 supported from frame 1 by means of the bracket 53 (Figure 5) in a manner to permit reciprocation of bed 3. Knife 52 is provided with a curved portion 54 extending upward between parallel plates 47 and terminates in a cutting point 55. As the fruit carried on member 46 rotates past knife 52 a slice 56 (Figs. 16 and 37) is removed from the blossom end of the fruit, and slice sections 57 and 58 located between the plates 47 and which had been previously cut by insertion into the receiving recesses 48 of member 46 are freed from the pulp. With the removal of slice section 56 a groove or channel 59 (Figs. 40 and 42) is formed around the fruit greater than the width of the strip removed by the thickness of the wedge shaped cutting plates extending substantially to the core or to the fin or rib or suture A of the pit 60 the only pulp remaining at the base of the channel being that indicated by 61 (Figs. 37 and 38) in the base of the channel or groove 59 and closely surrounding the pit 60. As the transfer member rotates, the slice of the flesh cut from the fruit by the knife 52 will be removed from between plates 47 by a knife 61′ (Fig. 5) suitably supported from the frame 1 by means of brackets 61″ and extending between the inner surfaces of the plates 47. The pulp sections 57 and 58 will be removed from between the plates 47 by the knife 52 as the plates are rotated.

Secured to projections or flanges at opposite sides of the forward end of the carriage 3 by means of the bolts 62 (Figs. 1, 2, 4, 17 and 18) are the aligned brackets 62′ which have formed integrally therewith the axially aligned bearing members. Bearing members 63—63′ are provided with bushings 64 in which the tubular extensions 64′ of heads 65 are slidably supported. Heads 65 are provided with flanges 66 to which elastic diaphragms 67 closing the mouths of heads 65 are secured by means of a securing ring 68 and the securing screws 69. (Figures 18, 19 and 20.) Disposed within a recess portion of diaphragms 67 are flat spiral spring members 70 which are held in position at the outer periphery by projecting sections of securing rings 68. Spring 70 at its center is secured to a cupped member 71 rigidly secured to or formed integrally with stems 72 to which are secured valve members 73. Valve members 73 close a valve seat 74 supported in the base of members 65, when diaphragms 67 are undeflected. Rigidly secured to the tubular extensions 64′ are tubular guide members 74′ slidably supported in the bearing 63′ and the ends of the extensions 74′ are connected by means of the flexible tubular connections 75 to a source of air pressure. An actuating link 76 is pivotally connected at one end by means of a collar 77 to each tubular extension 64′. At their opposite ends the links 76 are connected by means of the pins 78 to the crank 79. Each crank 79 is rigidly secured to a stub shaft 80 journaled in the supporting bracket 62′. Shaft 80 is driven by a pinion 81 which in turn meshes with and is driven by a gear 82. Gears 82 are rigidly secured and rotatable with spindles 83 journaled in brackets 62′, and are driven by pinions 84 which mesh with and are driven by racks 85 (Figure 21) formed on actuating members 86. Actuating members 86 are slidably supported in the tubular bearings 87 which are formed on the brackets 62′. Members 86 extend beyond the ends of the supporting member 87 (Figures 1, 17 and 21).

Figures 5, 6:
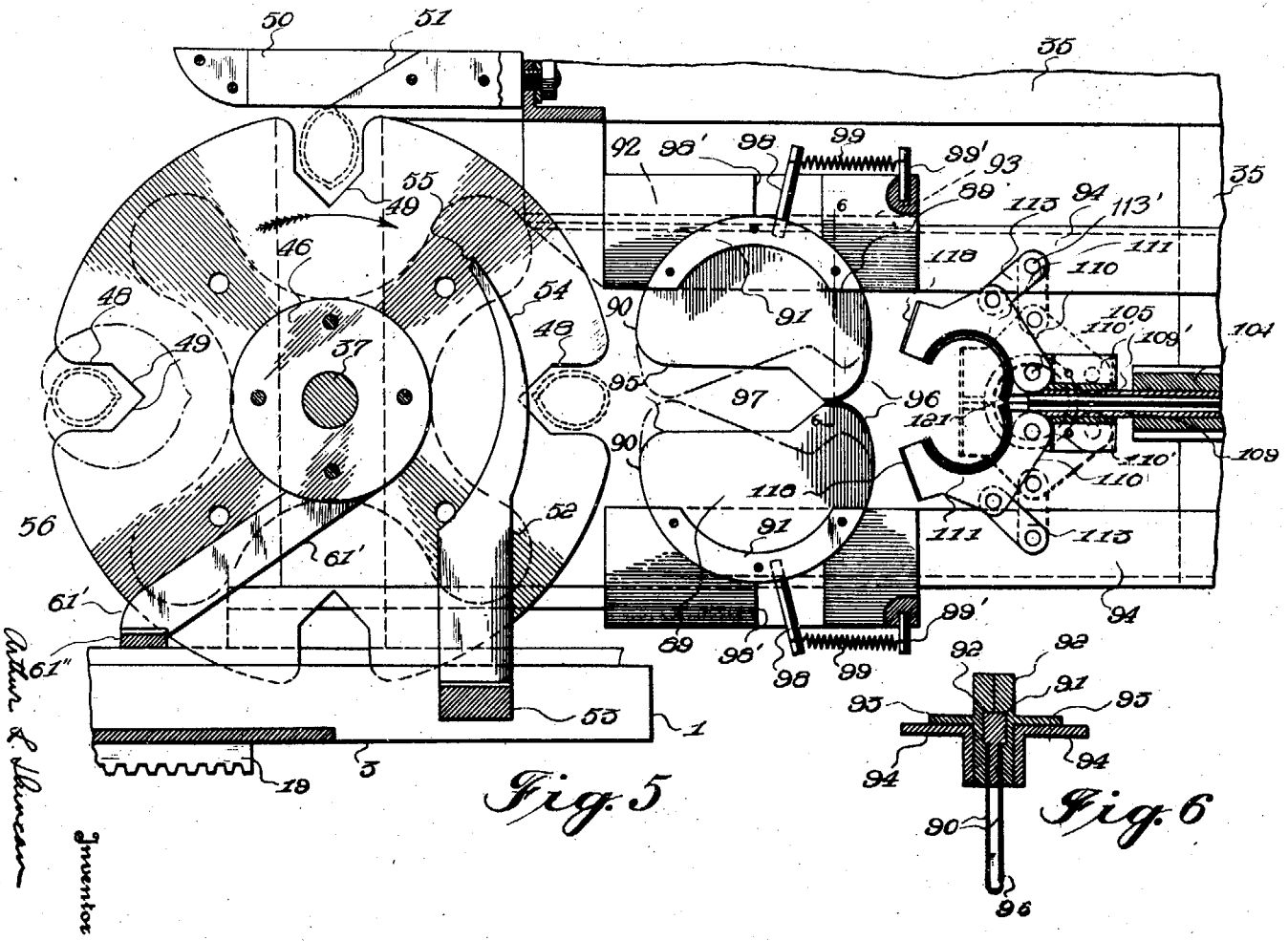
Figure 6 is a sectional view on line 6—6, Figure 5, of one of the pit groove scrapers.

As carriage 3 approaches the limit of its travel to the left in Figure 1, one end of the members 86 will engage the adjustable stops which are supported from framework 35. This forces the members 86, together with the racks 85 forward through the bearing members 87 and imparts a rotation to pinions 83 which will cause driving of the gears 82 and 81 to rotate the crank 79 and to impart an inward motion to the heads 65. The movement inward of the cup 65 causes a gripping of the fruit (Fig. 19) as will more fully hereinafter appear and causes unseating of the valves 73. This permits air pressure from the connection 75 to enter into the interior of heads 65 forcing the elastic diaphragms 67 and the springs 70 into engagement with the fruit with a pressure sufficient to hold the same securely without causing injury thereto. As carriage 3 moves to the right in Figure 1 a fruit such as a peach gripped between heads 65 will be forced between a pair of scraping knives 89 (Figs. 1 and 5) which are adapted to scrape the pulp 61 from the base of the groove or channel 59 which has been formed in the fruit. Scraping knives 89 are each formed of a pair of parallel blades 90 which have their outer surfaces spaced and positioned relatively so that they will enter into channels 59 formed in the fruit, as the carriage moves to the right. Blades 90 are secured to a curved supporting back 91 (Figures 1 and 6) which is slidably mounted in curved seats formed by the guide members 92. Guide members 92 are provided with supporting flanges 93 which are secured to cross members 94 of frame 35. The blades 90 are provided with edges 95 which are normally in parallel relation and spaced apart sufficiently to receive the pit or core of the fruit. Each pair of blades 90 is united by a section 96 which sections are normally in contact at 97 as shown in Figures 1 and 5. Knives 89 are provided with members 98 secured at one end to backs 91 and extending outwardly through slots 98′ formed in the guide member 92. Springs 99 secured at one end to the outer ends of members 98 and to pins 99′ of the fixed guide members 92. As the fruit held between the heads 65 is forced between knives 89 by movement of the carriage 3, the pit or core will engage the knife members 96 and will rock the knives to the position shown by the broken line in Figure 5, and the pulp at the base of the channel will be scraped from around the pit. As the fruit passes beyond members 96, springs 99 will restore knives 89 to the normal position shown in Figs. 1 and 5.

Figure 22:
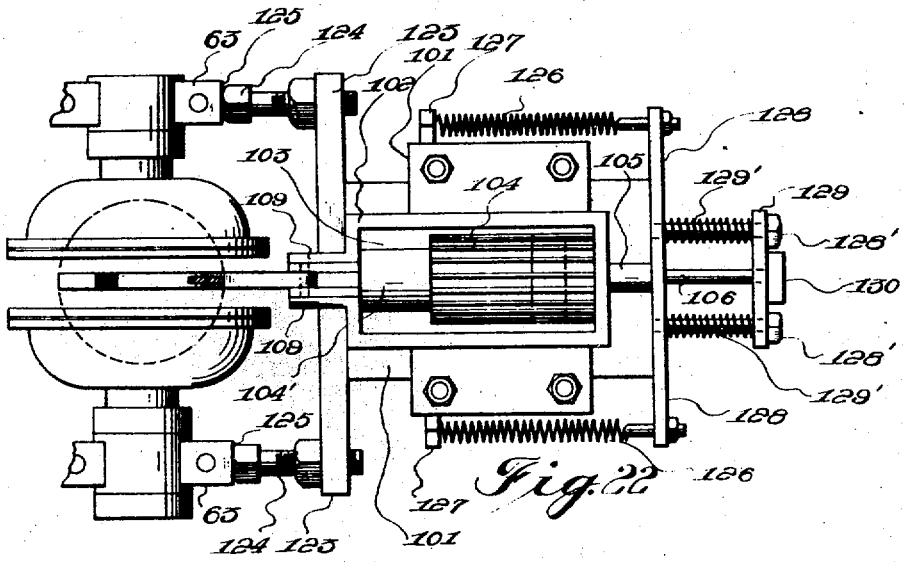
Figure 22 is a detailed sectional view of the supporting frame and mounting for the pit removing knives.

Supported from the frame at the rear end thereof are the standards 101 (Figures 1, 3, 22, and 32) in the upper end of which carriage 102 is slidably supported in suitable guide ways. Formed in the carriage 102 is a central opening or recess 103 (Figs. 22 and 32) in which elongated pinion 104 is mounted for rotation. The pinion 104 is provided with locating extension or shoulder 104′ to hold it in position in the recess 103 and is rigidly secured to a tubular member 105 rotatably supported in frame 103. Extending through the tubular member 105, and through the ends of the carriage 103 is a shaft 106 which is slidably keyed to the tubular member 105 by means of a key 107.

Figure 23:
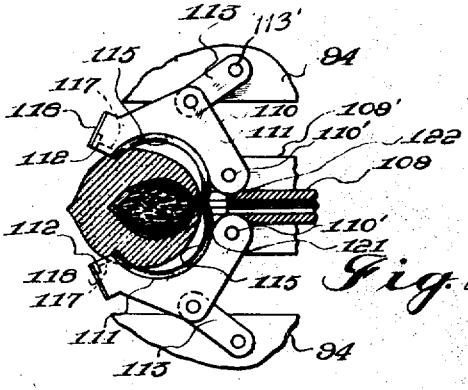
Figure 23 is a view in detailed elevation, partly in section, of the pit removing knives and their mounting about to embrace a pit and be received in the groove formed by the removed slice.

From the forward end of the carriage 102 extends a supporting member 109 in which the forward end of the shaft 106 is journaled, and to extensions 109′ of which the jaw members 110 are pivotally connected at 110′. Jaw members 110 have formed therein the recesses 111 which are shaped to encompass the pit or core of the fruit to be pitted or cored. In closed position of the jaws 110 (Fig. 24) the surfaces 112 thereof are in engagement. Connected pivotally to jaws 110 at their mid portions are the ends of links 113 which at their other ends are connected at points 113′ to frame members 94 by members 114. Pitting or cutting knives 115 are adapted to rest in recesses 111 of jaws 110 and are provided with three curved sides forming cutting edges 116. Formed on the outer end of each knife is a half cylindrical extension 117 (Figs. 25 and 26) resting in a half cylindrical seat formed in the surfaces 112 of jaws 110. Retaining plates 118 secured to the ends of jaws 110 are provided with the half conical centering members 119 which fit into half conical recesses 120 in the ends of the half cylindrical sections 117 (Figs. 23 to 27). When the jaws 110 are closed the flat sides of sections 117 of the knives 116 come together forming a cylindrical support for the knives 115 in the ends of jaws 110, and the ends of the sections 119 of the conical centering members are brought together in a manner to form a centering point about which the knives 115 may be rotated on their extensions 117 with relation to the ends of the jaws 110. At their opposite ends the knives 115 are pivoted or hinged at 121 to a supporting member 122 journaled in the ends of the extension 109 of carriage 102. Member 122 is secured preferably in detachable manner to the ends of the shaft 106. Formed integrally with or secured to carriage 102 are the side extensions 123 (Figure 22) in which the projecting actuating members 124 are adjustably secured. The actuating members 124 are positioned in alignment with the end surfaces 125 of the bearings 63 carried by the carriage 3, and as carriage 3 approaches the end of its movement to the right in Figure 1, the surfaces 124 and 125 of bearing 63 will engage the members 124 and will force the carriage 103 to the right in Figures 1 and 22 against the tension of springs 126. Springs 126 are secured at one end to standards 101 by means of the pins 127 and at their other ends are secured to extensions 128 of the carriage 102 and normally urge the carriage 102 to the left in Figures 1 and 22, holding the jaws 110 in open position as shown in Figure 23. The range of openings of the jaws is controlled by means of screws 124. The jaws are adjusted with opening sufficient to allow passage of the largest diameter pit measurement taken over the fin like or rib edge or suture of the pit. To permit the knives 115 to adjust themselves slightly in recesses 111 as the jaws 110 open and close, a slight endwise movement of the shaft 106 is permitted in the tubular member 105. To provide for this movement of knives 115, extensions 128′ of carriage 102 are provided upon which a movable plate 129 is supported. Plate 129 is normally held to the right in Figures 1 and 22 by means of the springs 129′ mounted on extensions 128. The end of the shaft 106 is extended through the plate 129 and terminates in a head 130. As jaws 110 and the knives 115 open, the shaft 106 is permitted to move forward, carrying with it, through the action of head 130, the movable plates 129 and compressing springs 129′ slightly. When jaws 110 are closed, springs 129′ will force the plates 129 and the head 130 together with the shaft 106 to the right until the knives are properly positioned for operation.

The pinion 104 meshes with and is driven by a gear segment 131 (Figure 32) which is rigidly secured to and rotatable with a spindle 132 suitably supported from standard 101. Spindle 132 is driven by a pinion 133 rigidly secured thereto which is formed on a rack member 135 which is guided for vertical reciprocating movement in a bore 136 formed in one of the members 101. Secured to the lower end of the rod 135 is a plate 137 (Figures 3, 29 and 31) which is provided with a vertical slot 138 into which the shaft 26 slidably fits. A cam roller 139, secured to an extension of plate 137 by means of a pin 139′, engages and is actuated by a cam 140 secured to shaft 26, rotates cam 140, imparts a vertical reciprocating movement to the plate 137 and to rod 135 guided by bore 136 and slot 138. As the rack 134 reciprocates vertically, an oscillating motion will be imparted to the shaft 106 and the knives 115 through pinion 133, gear segment 131 and the pinion 104.

*Operation*

Figure 35:
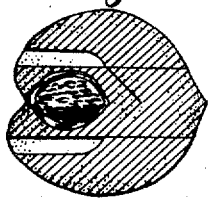
Figure 35 is the same view of the same peach after the impaling knives have positioned the same within one of the slots of the transfer member, the lines indicating the cuts formed by the edges of the transfer member.

In operation of the machine the main shafts 33 and 26 are continuously driven from the drive pulley 34 (Fig. 2). Rotation of the shaft 26 actuates the cams 28 and 28′ (Figures 1 and 30) which engage the rollers 27 and 27′, imparting a reciprocating motion to member 24 (Figure 1). Reciprocation of the member 24 oscillates the arm 23 about its pivot and causes the pinion 20 to be actuated back and forth across the rack 21. This movement of the pinion 20 causes a rotation thereof and reciprocates rack 19 and carriage 3. As carriage 3 reaches the left end of its travel in Figure 1, it comes to rest momentarily as the relatively flat portion 29 of the cam 28 passes by roller 27. In this interval of rest of the carriage, the operator positions a fruit such as a peach to be pitted with the point of attachment of the stem of the fruit against the center point 12 of the centering member 11 as shown in Figure 8, and with the fruit in such a position that a plane through the greatest width of the pit will be in alignment with the knives 7. When the fruit to be pitted is a peach, the peach will be held in such position that the central vertical plane of the knives 7 will be substantially in a plane through the natural crease B, through the fin like edge A (Figure 12) of the peach. In this way the crease is used as a guide for the operation in impaling the fruit. When the fruit has been properly positioned, the operator forces it to the rear on the knives 7 and the parts will then assume the position shown by the dotted line in Figure 8. The operation of impaling the peach should be completed before the rotation of cam 28 moves the carriage 3 to the right in Figure 1. As cam 28 rotates, the carriage 3 will be moved to the right and when the carriage approaches the end of its movement to the right, the functioning and relation of parts is such that transfer member 46 will be positioned with one set of the fruit receiving recesses 48 in proper position to receive the impaled fruit. As the projection 30 of cam 28 passes the roller 27, the fruit will be plunged into the aligned receiving recess 48 as shown in Fig. 11 with a plane through crease B (Figs. 12 and 14) positioned between and substantially parallel to plates 47. The fruit will be cut substantially to the depth of the pit as indicated in Figures 13, 14 and 35, and will be held with the fin like or ribbed edge or suture of the pit disposed between the plates 47.

As the rotation of the shaft 26 continues, cam 28′ will engage the roller 27′ of the member 24 causing movement of member 24 together with pinion 20 and carriage 3 to the left in Figure 1 and withdrawing the impaling knives 7 from the fruit. As the carriage 3 returns to the left in Figure 1 pin 41 of the crank 40 will rotate in the direction of the arrow and will enter the slot 42 of the member 38 positioned to the right thereof and will rotate member 38 and the shaft 37 through an angle of 90 degrees. When the bed 3 approaches the end of its movement to the left as shown in Figures 8 and 9, the end of the member 11 will engage the balls 14 (Fig. 8) in the projection 16 of the frame 1, and the centering member 11 will be returned to the full lined position shown in Figures 1 and 8 as the carriage 3 reaches the end of its stroke. The operator then impales another fruit on the knives 7 during the momentary interval in which carriage 3 is at rest as set forth and the carriage then starts on another movement to the right. As carriage 3 approaches the end of this movement to the right, another set of receiving recesses 48 of the transfer member will be positioned to receive the fruit as above set forth. The carriage will then start on its return movement to the left in Figure 1 and the impaling knives 7 are withdrawn from the fruit. Pin 41 of crank 40 will enter into another slot 42 of the member 38 which will be properly positioned to receive the same, and will impart another rotation of 90 degrees to the shaft 37.

Figure 36:
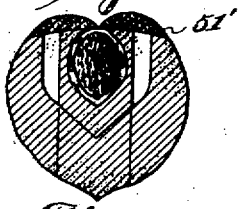
Figure 36 is a similar view of the fruit during the cycle of its operation, the darkened area indicating the first portion of the slice removed in the formation of the annular groove.

Rotation of member 46 will carry the fruit plunged in recesses 48 past the knives 50 and 51 (Figures 1, 5 and 15) and a slice will be removed from the stem end of the fruit as shown in Figures 15 and 36. Further rotation of transfer member 46 will carry the fruit past the cutting knives 55 and will remove a slice from the blossom or spike end of the fruit as shown in Figures 16 and 37. On this second forward movement of carriage 3 after the fruit is transferred to member 46, it will be positioned between heads 65 and as the carriage 3 approaches the end of its movement to the left in Fig. 1, rack member 86 (Figures 1, 17 and 21) will engage the step members 88, and will force the rack members 86 forward in their bearings 87. Movement of rack members 86 will cause the racks 85 to rotate pinions 84, which in turn will impart a rotation to the shafts 83, gears 82, pinions 81 and crank 79. Crank 79 will move through 180 degrees causing links 76 to shift collars 77 and tubular members 64′ together with heads 65 inward to engage the fruit positioned between the heads. As the heads 65 move inward, the central cup members 71 thereof will engage opposite sides of the fruit and elastic diaphragms 68 will deflect in conformation with the configuration of the fruit, unseating valves 73, and permitting sufficient air pressure to enter the cup 65 and back of the diaphragm 68 to cause a firm gripping of the fruit without exerting sufficient pressure thereon to deform the fruit.

As the carriage 3 moves forward in its next movement, the fruit gripped between heads 65 will be removed from the transfer member 46 and carried forward or to the right in Figure 1, with a channel or groove 59 formed therein as indicated in Figure 38. As the carriage 3 moves forward, knives 89 will enter channel 59 with the pit disposed between edges 95 of plates 90. Continued forward movement of carriage will force the pit past the scraping members 96 of knives 89 causing the knives to rotate in the curved seats formed in guides 92, as indicated by the broken lines in Fig. 5, against the tension of the springs 99. This will result in scraping the pulp 61 in the bottom of channel 59 from the pit substantially as indicated in Figure 39. After the pit has passed the knives 89, springs 99 will return the knives 89 to the full line position shown in Figures 1 and 5.

Figure 24:
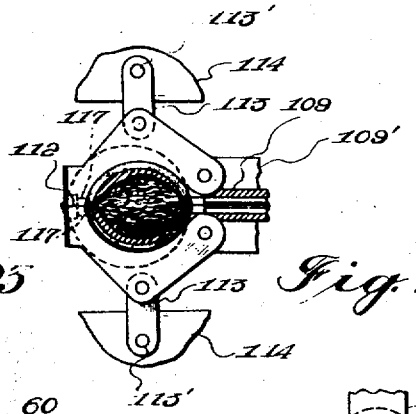
Figure 24 is a view similar to Figure 23 with the pit removing knives received in a groove.
Figures 25, 26:
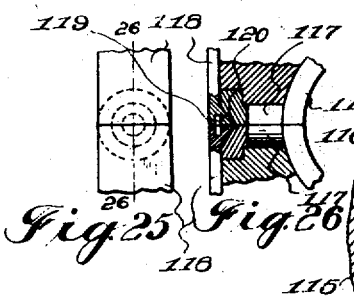
Figure 25 is a view in end elevation of the knife mounting frame illustrating in dotted lines the bearing for the pit removing knives.
Figure 26 is a vertical sectional view on line 26—26 of Figure 25.
Figure 27:
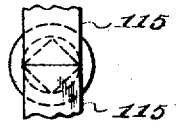
Figure 27 is a fragmental view of the pitting knives.

As movement of the carriage 3 to the right continues, the fruit will be positioned between the jaws 110 as shown in Figure 23. Further movement of the carriage to the right will cause surfaces 125 of the bearings 63 thereof to engage the projecting stubs or actuating members 124 of the carriage 102, and carriage 102 together with the jaws 110 will be forced to the right in Figures 5 and 23. As the carriage 102 moves to the right, links 113 will swing about their fixed pivots and the jaws 110 together with knives 115 and the related parts will be forced to closed position shown by the dotted line position in Figure 5 and shown in Fig. 23. Jaws 110 will enter channel 59, encompassing the pit as shown in Figure 24 and will hold the fruit against rotation.

During the forward movement of the carriage 3, as the fruit between heads 65 is being positioned between the jaws 110, another fruit will be transferred from the impaling knives 7 to the transfer member 46. While jaws 110 are closing in channel 59 in the fruit positioned between heads 65, rack members 86 will engage stop members 142 (Fig. 1) supported from the frame members 35, forcing rack members 86 to the rear in the bearing members 87 and causing rotation of pinion 84 and the parts driven thereby in a reverse direction. This reversal of rotation of pinion 84 will rotate the crank 79 causing a return movement of the links 76 and outward movement of the tubular members 64 and the heads leaving the fruit supported in jaws 110. Air under pressure from the flexible connection 75 will then force diaphragms 68 outward causing the valves 73 to seat and cutting the air pressure from the interior of heads 65.

Figure 28:
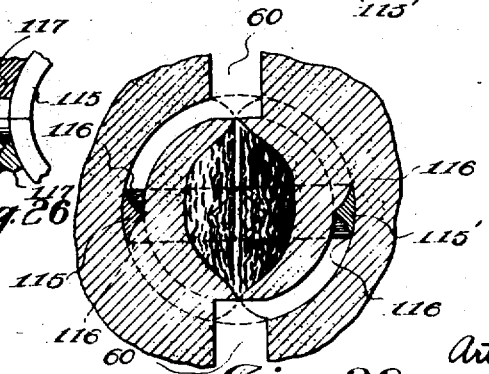
Figure 28 is a view through a fruit with the pitting knives in operation during the removal of the pit therefrom and illustrating particularly the annular groove formed in the fruit by the removal of the slice.
Figure 34:
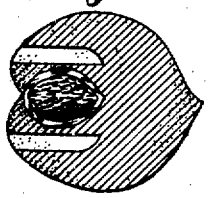
Figure 34 is a vertical sectional view of a peach mounted on the impaling knives.

As soon as the jaws 110 are closed and the pit or core is encompassed by the knives 115, the high portion of the cam 140 on shaft 26, (Figs. 3, 29, and 31) will pass by the roller 139 and will force plate 137 together with the rod 135 and the rack 134 upward. Upward movement of the rack 134 will rotate the pinion 133 and segment 131, causing a rotation of the pinion 104 and shaft 106. Rotation of shaft 106 will rotate the knives 115 as indicated in Figure 28 to form a cut around the pit of the fruit starting from the fin like or rib edge or suture of the pit, and will free the pit from the separated halves of the pulp or flesh as indicated in Figures 41 and 42 of the drawings.

As soon as the cups 65 are moved outward carriage 3 may return to the left in Figure 1 and as it reaches the left end of its stroke heads 65 will again move inward to grip a fruit or peach positioned in the transfer device 46, and the cycle of operations above set forth will be repeated. As soon as the knives 115 have rotated through about 180 degrees the roller 139 may drop off of the high point of the cam 140, and knives 115 will be returned by the weight of the parts to their initial position nested in the recesses 111 of the jaws 110 for the next operation. As the carriage 3 returns to the left in Figures 1 and 22 the surfaces 125 will be disengaged from the end of projecting members 124 of carriage 102 and springs 126 will return carriage 102 to the left causing the jaws 110 to open as shown in Figures 5 and 23. As the cut is formed around the pit by the knives 115 the freed halves of the fruit will drop away from the pit.

It will be seen that the parts are all properly timed so that a continuous cycle of operations is carried out on peaches and like fruits which comprises forming a channel, cut grooves, or incision around the fruit entering of the pitting knives in the channel cut or groove so formed along the fin like or rib edge or along the line of the suture of the pit, and then severing the pit from the pulp by starting from the fin like or rib edge or suture of the pit and cutting through the pulp to free the same from the pit. While the pitting of peaches has been specifically described it will be understood that plums, pears, apples and like fruit may be cored and halved in accordance with my improved methods and by my improved apparatus.

The novel method of pitting fruit carried out automatically by the apparatus herein specifically set forth may obviously be carried out in various manners and for pitting peaches consists essentially in entering a cutting knife or knives along the fin like or rib edge or suture of the pit, severing the pit from the halves by starting from the fin like or rib edge or suture of the pit and separating the pulp in halves. The method may obviously be carried out by hand by inserting a cutting knife or pitting spoon from the stem end of the fruit along the fin like or rib edge or the suture edge of the pit in the plane of the crease, which appears on the outside of the peach, then cutting from the fin like or rib edge or the suture of the pit around and through the pulp to free the pulp from the pit, and either before or after the pulp has been cut to the depth of the pit, the pitting spoon or knife may be withdrawn and a cut formed around the peach to separate the same in halves either in the plane of the crease or elsewhere around the peach. It will be then found that the halves may be separated and the pit will drop from the pulp. My improved methods may be carried out by removing a slice from around the pit of the fruit as disclosed in my Patent No. 1,441,490, inserting a pitting knife or spoon in the channel formed in this manner around the pulp, and cutting the pit free from the pulp. Instead of cutting a slice from the pulp to form a channel, a cut may be formed in the fruit in the plane of the crease or fin like or rib edge or the suture of the pit, and the pulp may be wedged apart sufficiently either by the cutting knife or another implement to separate the pulp. A pitting knife may be entered in the channel so formed along the fin like or rib edge or the suture of the pit and utilized to separate the pulp from the pit.

It will be seen that the improved methods carried out by my apparatus hereinbefore set forth may also be carried out by different forms of apparatus.

Accordingly, having described preferred embodiment of apparatus for carrying out my invention, and various ways by which the methods involved may be carried out independently of the particular apparatus, what is desired to be secured by Letters Patent and claimed as new is:

1. A peach pitting and halving apparatus including means for cutting and removing an annular slice circumferentially from the peach substantially to the depth of the pit, to separate the pulp into halves each adhering to a portion of the pit, and means receivable in the annular groove formed by the removal of the slice and movable circumferentially of the pit at right angles to the groove for severing the adhering portions of the pulp from the pit.

2. A peach pitting and halving apparatus including means for forming a groove circumferentially of a peach to the depth of the pit to divide the pulp into sections each adhering to the pit, and a knife receivable in said groove and movable about the longitudinal axis of the pit for severing the adhering portions of the sections from the pit.

3. A peach halving and pitting apparatus including devices for cutting a peach circumferentially in parallel planes substantially to the depth of the pit and for removing the portion between the cuts from the peach to form a groove circumferentially of the same and to form the pulp into sections each adhering to the pit, and means receivable within the groove for embracing the pit and movable around the pit to separate the adhering portions of the sections from the pit.

4. A peach halving and pitting apparatus including means for cutting a peach annularly to separate the pulp to the depth of a central core to be removed comprising the substantially intact pit; normally curved cutting means receivable in the line of said cut; and means for rotating said cutting means about said pit in a manner to cut said central core free from the pulp.

5. The combination as set forth in claim 4 together with means for holding the cut peach in position to be engaged by said cutting means.

6. A peach halving and pitting apparatus including means for cutting a peach annularly to separate the pulp substantially into halves, with a portion of each adhering to the pit, means for separating the adhering portions of the halves from the pit, peach feeding means including a pair of peach impaling knives, and means for centering the peach onto said knives.

7. A peach halving and pitting apparatus including means for cutting a peach annularly to separate the pulp substantially into halves, with a portion of each adhering to the pit, means for separating the adhering portions of the halves from the pit, peach feeding means including a pair of peach impaling knives, and means for reception within the stem depression of the peach for centering the same onto the knives.

8. A peach halving and pitting apparatus including means for cutting a peach annularly to separate the pulp substantially into halves, with a portion of each adhering to the pit, means for separating the adhering portions of the halves from the pit, peach feeding means including a pair of peach impaling knives, and means movable relative to the knives for reception within the stem depression of the peach for centering the same onto the knives.

9. A peach halving and pitting apparatus including means for cutting a peach annularly to separate the pulp substantially into halves, with a portion of each adhering to the pit, means for separating the halves from the pit, peach feeding means including impaling devices and a centering member one movable relatively to the other, the centering member adapted for projection in advance of the impaling devices for reception within the depression at the stem end of the peach for guiding the peach onto the impaling devices.

10. A fruit halving and pitting apparatus including movable means for receiving and arcuately cutting a peach inwardly from its surface substantially to the depth of the pit for a portion of the circumference and in parallel planes substantially diametrical, devices for completing the circumferential cut of the peach in the same planes and for removing a slice to the depth of the pit between said cuts to provide a groove circumferentially of the peach and form half portions each adhering to the pit, means receivable in the groove and movable circumferentially of the pit for severing the adhering portions of the half sections from the pit, and conveying members for engaging the fruit and for conveying the same from the movable cutting means to the pit removing means.

11. A fruit halving and pitting apparatus including movable means for receiving and arcuately cutting a peach inwardly from its surface substantially to the depth of the pit for a portion of the circumference and in parallel planes substantially diametrical, devices for completing the circumferential cut of the peach in the same planes and for removing a slice to the depth of the pit between said cuts to provide a groove circumferentially of the fruit and form half sections each adhering to the pit, means receivable in the groove and adapted for yieldably engaging the pit to remove the pulp substantially in the plane of the groove adhering thereto, means receivable in the groove and movable circumferentially of the pit for severing the adhering portions of the halves therefrom, and members for engaging the fruit on opposite sides of the groove and for conveying the same from the movable cutting means through the apparatus.

12. A peach halving and pitting apparatus, including means for cutting an annular slice from a peach to the depth of the pit, means receivable in the depression formed by the removal of the slice and movable circumferentially of the pit at right angles to the walls of the depression to separate the adhering portions of the pit from the halves, and means in the form of opposing cooperating cupped members engaging the fruit and conveying the same through the apparatus.

13. A peach halving and pitting apparatus including means for halving and pitting a peach, peach conveying means comprising opposing co-operating cupped members, elastic engaging surfaces associated with the cupped members, means for moving the cupped members to and from each other into and from peach engaging and releasing position, and means for exerting a fluid pressure on said elastic surfaces to cause the same to conform to the contour of a portion of the peach engaged thereby, and a fluid pressure controlling valve automatically opened on the engagement of the fruit between said members.

14. A peach halving and pitting apparatus including means for halving and pitting a peach, peach conveying means comprising opposing co-operating cupped members, means for moving the cupped members to and from each other, an elastic surface over the mouth of each cupped member for closing the same, means for exerting a fluid pressure within each cup for causing the elastic surfaces to conform to the contour of a portion of the fruit engaged thereby, and means for moving said cups in unison at right angles to their movement relative to each other.

15. A peach halving and pitting apparatus including means for halving and pitting a peach, peach engaging means comprising a pair of co-operating cupped members movable on a common axis to and from each other into peach engaging and releasing position, a movable bed on which said cupped members are mounted, means for reciprocating the bed, and devices coacting with the cupped members for imparting relative movement thereto during the reciprocation of the bed in opposite directions.

16. A peach halving and pitting apparatus including means for halving and pitting a peach, said means including a pair of oscillatory knives, each consisting of a pair of parallel blades, the co-operating blades of opposing knives being disposed in parallel planes with the forward portion of the cutting edges normally lying in spaced relation providing a normally open pit receiving recess, the rearward portion of said cutting edges converging toward each other, scraping means disposed transversely across the rear portions of the cutting edges of the respective pairs of blades, yieldable means for normally maintaining the forward portions of the knives separated, and means for conveying a fruit therebetween to cause a slice of pulp to be removed to the depth of the pit.

17. A fruit pitting or coring apparatus comprising means for separating the pulp of the fruit to be pitted or cored substantially to a central core to be removed, and means adapted to enter between the separated portions of the pulp to hold the fruit and to sever the central core to be removed from the pulp.

18. In combination, means for separating the flesh portion of a fruit to a central core to be removed therefrom; and holding and cutting means adapted to enter between the separated flesh portion to hold the fruit and sever a central core from the fruit.

19. A fruit pitting and coring apparatus comprising means for engaging the fruit to be pitted or cored within the outer periphery of the flesh portion thereof and outside of the periphery of the central core to be removed, and means disposed within said first mentioned means for severing the central core to be removed from the outer flesh portion thereof, the central core being positioned by engagement with said last mentioned means.

20. In a fruit pitting apparatus, means for separating the flesh portion of the fruit to be pitted substantially to the depth of a central core to be removed therefrom and substantially through the plane of greatest sectional area of the pit; and means for cutting a core whose outer surfaces are surfaces of revolution and including the substantially intact pit from the flesh portion of the fruit starting from said plane.

21. A fruit coring and pitting apparatus comprising means for cutting the pulp of the fruit substantially to the depth of a central core to be removed; severing means receivable in the line of said cut and normally shaped to conform to the outline of the central core to be removed; and means for rotating said severing means starting from the line of said cut through the pulp of the fruit to sever said central core from the remainder of the fruit.

22. A peach pitting aparatus comprising means for forming a channel in the pulp of the fruit to be pitted substantially to the depth of a central core to be removed comprising the whole pit; means embodying a curved recess for entering said channel; a curved pitting knife normally nested within said curved recess; and means for rotating said knife.

23. The combination as set forth in claim 21 together with holding means comprising a member adapted to engage the periphery of the fruit to position the same for said curved knife.

24. The combination as set forth in claim 21 in which said severing means comprises a pair of curved pitting knives.

25. A device of the class described, comprising a support, cooperating slicing members mounted on said support in predetermined relation, and having a guideway formed therein to permit the passage of a fruit in the formation of a slice, providing access to the pit.

26. In a fruit pitter, the combination of a fruit holder having a slot adapted to receive an intact fruit pit, the fruit holder providing spaced apart members having flat surfaces lying in the same plane adapted to hold the fruit in a kerf formed in the fruit on opposed sides of the pit, and pitting means adapted to sever the pit from the fruit when held on said fruit holder.

27. In a fruit pitter, the combination of a fruit holder providing spaced flat blades adapted to hold the fruit from within the interior of the fruit on opposed sides of the intact pit and revoluble knives adapted to sever the pit from the fruit when so held by said fruit holder.

28. In a fruit pitter adapted to receive a fruit with its pit intact, of slotted means for holding the fruit in a kerf formed on opposed sides of the pit, curved pitting means conforming to approximately one half of the contour of the pit adapted to enter said fruit in the kerf, and means adapted to rotate the pitting means about an axis passing approximately through the center of the pit to sever the fruit flesh from the pit and permit the fruit to fall from said holding means in halves.

29. In a fruit pitter, means for substantially dividing a fruit in its plane of suture into halves held together by the fruit pit, means for holding the fruit by engaging the fruit between the halves, and means movable transversely of said holding means in a predetermined path for severing the flesh of the fruit from the fruit pit to free the fruit pit from said fruit halves.

30. In a fruit pitter, the combination of means for substantially dividing the fruit into halves in the plane of its suture, means for supporting the fruit on opposite sides of the fruit pit between the said halves, the supporting means being arranged to be engaged by the pit to locate it in predetermined position, and means adapted to enter the fruit around the pit thus held through the device formed in the flesh of the fruit to sever the flesh from the fruit pit and permit the divided portions of the fruit to fall away from the support.

31. In a fruit pitter, means for cutting the flesh of the fruit substantially into halves adhering to the intact pit, means for supporting the fruit by engaging the fruit between the halves on opposite sides of the pit, means operable to pass over the pit in a curved predetermined path and separate the halved fruit from the intact pit.

32. In a fruit pitter, means for slicing the flesh of the fruit in the plane of its suture, means engaging the fruit within the slice on opposite sides of the intact pit, and means for severing the halved flesh of the fruit from the intact pit.

33. In a cling-stone peach pitter, the combination of means for cutting the peach on opposed sides of the stone substantially to the depth of the stone to substantially divide the peach into two halves held together by the stone, means for holding the peach from within the cuts formed, and means adapted to enter the cuts and pass around the stone to sever the flesh of the peach from the stone and complete the division of the peach into halves, said last named means moving transversely of the holding means at the beginning and end of its severing cut, whereby said holding means cooperates with said last named means to produce clean cuts.

34. In a fruit pitter, means for forming a kerf in the flesh of the fruit in the plane of its suture, means engaging the fruit within the kerf for supporting the fruit with the pit intact, and pitting means lying substantially in the plane of said supporting means and adapted to pass over the pit from said plane and to return to said plane to sever the fruit flesh from the pit and cause the halved flesh of the fruit to fall from the support free from the intact pit.

35. In a fruit pitter, means for cutting the flesh of the fruit substantially into halves adhering to the intact pit, means to support the fruit by engaging the same between the halves on opposite sides of the pit, and curved knives to pass over the pit while the fruit is mounted on the support and separate the halves from the pit.

36. A fruit pitter comprising means to form a halving cut in the flesh of the fruit, rotatable means to cut the intact pit from the fruit, said means conforming approximately to a substantial portion of the outline of the pit in the plane of its suture and designed to cut the pit from the flesh of the fruit, means to hold the fruit while said pitting means is functioning, and mechanism operating in timed relation to bring said holding means into operation and to then rotate said pitting means.

37. A fruit pitter comprising rotatable means to cut the pit from the fruit, said means conforming approximately to a substantial portion of the outline of the pit in the plane of its suture and being arranged to contact with an edge of the substantially intact pit to position said pit with respect thereto, holding means normally out of engagement with the fruit, and operating mechanism driven from a single element to move said holding means into position to hold the fruit and to then rotate said pitting means.

38. A fruit pitting apparatus including a pair of fruit guiding members disposed in spaced relation with their opposing edges forming a pit receiving recess, means for moving said members to open and closed position, rotatably mounted pit removing means associated with said fruit guiding members, and means for operating said pit removing means.

39. A fruit pitter comprising two opposed blades having complementary recesses adapted to cooperate to receive the pit of the fruit, an arcuate knife disposed in one of said recesses, said knife being rotatable upon an axis parallel to the meeting edges of said blades so as to swing into the other recess, and means for rotating said knife.

40. A fruit pitter comprising two opposed blades mounted for movement toward and away from each other, said blades being shaped to approximately fit around the pit of the fruit, means to operate said blades and arcuate pitting means arranged between said blades and normally lying substantially between parallel planes bounding the sides of said blades but arranged to rotate around said pit.

41. In a fruit corer, the combination of a fixed impaling blade provided with cutting edges to form a kerf partly around the core of the fruit, a movable impaling blade provided with cutting edges to substantially complete the formation of a kerf around said core, a curved coring knife of a width approximating the width of the kerf formed by said blades and arranged to enter said kerf and partly surround the core, and means to rotate said knife.

42. In a fruit pitter, the combination of a fixed impaling member provided with cutting edges to form a kerf partly around the pit of the fruit, a movable impaling member provided with cutting edges to substantially complete the formation of a kerf around said pit, a pitting knife of a width approximating the width of the kerf produced by said members and arranged to enter said kerf and partly surround said pit, means to hold the fruit during the operation of said pitting knife and mechanism to successively operate said holding means, and to rotate said pitting knife.

43. In a fruit pitter, means for cutting the flesh of fruit substantially into halves in the plane of suture of the fruit pit, said halves being held together by the fruit pit, means for holding the fruit from within the cut, a curved pitting knife normally positioned in the plane of the cut and means for rotating the curved pitting knife around the pit to sever the halves of the fruit from the pit.

44. In a cling-stone peach pitting machine, the combination of means for cutting the flesh of the peach in the plane of suture substantially in halves held together by the stone of the peach, means to support the peach from within the halves on opposite sides of the stone, a curved pitting knife mounted in the plane of suture of the peach and means to rotate the curved pitting knife around the stone to substantially complete the dividing of the peach into halves.

45. In a cling-stone peach pitter, the combination of means for holding a peach from within a cut formed in the plane of suture of the peach on opposed sides of the pit, a curved pitting knife having a sharp cutting edge mounted in the plane of suture, and means for rotating the said knife to cause said cutting edge to cut the flesh of the fruit from the pit.

46. In a cling-stone peach pitter, the combination of means for holding a peach from within a cut formed on opposed sides of the peach in the plane of suture thereof to substantially divide the peach into halves held together by said pit, pitting means mounted in said plane of suture and adapted to enter the peach in said cut, the holding means being positioned in the path of movement of the peach to locate the peach and pit in relation to said pitting means, and means to actuate said pitting means to sever the flesh of the fruit from said pit.

47. A device of the class described comprising a support and a stationary slice-forming means mounted on said support adapted to form a slice in fruit moved thereover to provide access to the pit.

48. In combination, a support, a fruit-pitting mechanism mounted on said support, and a slice-forming means mounted on the support in predetermined relation with pitting mechanism.

49. In combination, a fruit-pitting mechanism, and a slice-forming means associated with said pitting mechanism for delivering fruit at the end of the slice-forming operation in predetermined relation to the pitting mechanism.

50. In combination, a fruit-pitting mechanism having pitting knives, and a slice-forming means associated therewith having a discharge end for directing fruit provided with a slice into operative relation with said pitting knife to permit removal of the pit in the operation of the knives.

51. A peach pitting machine comprising two relatively movable holding members provided with matching recesses formed together to substantially surround the pit of a peach when brought together and a pair of pitting knives normally arranged to be nested in said recesses, and means to move said knives around the pit and to return them to their nested position in said recesses.

52. A peach pitting machine comprising means to form a cut around the substantially intact pit of the peach, a pair of relatively movable curved pitting knives arranged to be entered in said cut and to center the pit with respect to said knives when said knives are brought to their operative position surrounding a substantial part of said pit and means to simultaneously move said knives from said position around said pit.

53. In a fruit pitter, the combination of means for cutting the flesh of the fruit into halves adhering to the intact pit, means for supporting the fruit by engaging the fruit between the halves on opposite sides of the pit, pitting means lying substantially in the plane of said supporting means and adapted to enter the flesh of the fruit through the cut formed, and means for actuating the pitting means to pass the said pitting means over the pit and separate the halved fruit from the intact pit.

54. In a device of the class described, the combination of means adapted to hold a fruit within a kerf formed on opposed sides of an intact fruit pit, and severing means arranged to pass around said intact pit to sever the fruit from the pit, said severing means at the beginning and end of its movement being disposed so as not to project substantially laterally of said first named means.

55. In a fruit pitting or coring apparatus, means for cutting the fruit to be cored or pitted within the outer periphery of the fruit pulp to be cored, and curved rotatable knives for cutting a central core free from the pulp, the pit of the fruit being centered by engagement with the knives.

56. An apparatus for removing the pit from a fruit having a circumferential groove or channel formed therein substantially to the depth of the pit, including fruit guiding means for reception in the groove, a pitting knife for reception in the groove in proximity to the surface of the pit, and means for moving the knife about the pit to sever the fruit therefrom.

57. An apparatus for removing the pit from a fruit having a circumferential groove or channel formed therein substantially to the depth of the pit, including fruit guiding means for reception in the groove, a pitting knife for reception in the groove in proximity to the surface of the pit and adapted for severing the portion of the fruit at the side of the groove from the pit.

58. An apparatus for removing the pit from a fruit having a circumferential groove or channel formed therein substantially to the depth of the pit, including fruit guiding means for reception in the groove, a pitting knife for reception in the groove in proximity to the surface of the pit, and means for severing the pit from the fruit by a relative movement of the knife and fruit at substantially right angles to the side wall of the groove.

59. An apparatus for removing the pit from a fruit having a circumferential groove or channel formed therein substantially to the depth of the pit, including fruit guiding means for reception in the groove, a pair of pitting knives for reception in the groove at the opposite sides of the pit, and means for moving the knives substantially one-half revolution about the pit to sever the fruit portions lying at opposite sides of the groove from the pit.

60. In a seeding and coring machine comprising in combination means adapted to grip and hold a fruit which has a section removed, said means extending from the periphery toward the core in the removed section and engaging the fruit pulp, the means adapted to grip and hold the fruit including a plurality of plates adapted to be inserted in the removed section of the fruit and thereby hold the fruit.

61. In a seeding and coring machine comprising in combination a plurality of plates adapted to be inserted in the removed section of the fruit and thereby hold the fruit, having in addition means to remove the core, comprising a rotary knife and means to rotate the knife.

62. A seeding and coring machine comprising a pair of revolvable knives, a plate above said knives, a second plate below said knives, means to converge and diverge said plates about the seed in the grooved fruit, and means to rotate said knives.

63. In a fruit pitting apparatus including a pair of fruit guiding members disposed in spaced relation with their opposed edges forming a pit receiving recess, means for moving said members relatively to opened and closed position, rotatably mounted pit removing means associated with said pit guiding members, and means for operating said pit removing means.

In testimony whereof I affix my signature.

ARTHUR L. DUNCAN.